(12) United States Patent
Geiger et al.

(10) Patent No.: US 7,653,465 B1
(45) Date of Patent: Jan. 26, 2010

(54) SYSTEM AND METHOD FOR REMOTE CONTROL OF LOCOMOTIVES

(75) Inventors: John A. Geiger, Pittsford, NY (US); Thomas C. Mayo, Honeoye Falls, NY (US)

(73) Assignee: Microwave Data Systems, Inc., Rochester, NY (US)

( * ) Notice: Subject to any disclaimer, the term of this patent is extended or adjusted under 35 U.S.C. 154(b) by 502 days.

(21) Appl. No.: 11/324,713

(22) Filed: Jan. 3, 2006

Related U.S. Application Data

(63) Continuation of application No. 11/263,880, filed on Nov. 1, 2005, now abandoned.

(60) Provisional application No. 60/624,493, filed on Nov. 1, 2004.

(51) Int. Cl.
*G05D 1/00* (2006.01)
(52) U.S. Cl. .......................... 701/19; 701/36
(58) Field of Classification Search .................. 701/19, 701/20, 1, 2; 246/187 C, 186; 340/992, 340/993; 370/328, 337, 346, 349
See application file for complete search history.

(56) References Cited

U.S. PATENT DOCUMENTS 5,681,015 A * 10/1997 Kull ....................... 246/187 C
6,862,502 B2 * 3/2005 Peltz et al. .................... 701/19
2003/0151520 A1 8/2003 Kraeling et al.
2003/0214417 A1 * 11/2003 Peltz et al. .................. 340/825
2004/0100938 A1 5/2004 Aiken, II et al.
2004/0114631 A1 6/2004 Aiken, II et al.

* cited by examiner

*Primary Examiner*—Richard M. Camby
(74) *Attorney, Agent, or Firm*—GE Global Patent Operation; Roger C. Philips

(57) ABSTRACT

The present invention is directed to the remote control of locomotives, and more particularly to various methods and apparatus employed in implementing systems for such remote control. Contemplated in the present invention are systems and methods for not only reliable remote-control communications, but also the use of repeaters and communications servers to assure reliable, centralized communication between locomotives and operator control units. In another embodiment, there is described a reliable distributed communication mode using an uncorrelated time sequence that does not interfere with a time division multiple access network. Differentiation between the centralized mode and the distributed mode is accomplished by assessing whether a locomotive and control unit is within a rail yard's infrastructure. Moreover, reliability is assured using a coordination server that dynamically routes packets between multiple satellite RCL repeaters based on received signal strength. Lastly, the present invention further contemplates the use of an out-of-band transmission to upgrade and test operator control units, thereby allowing for field maintenance and software upgrades.

9 Claims, 16 Drawing Sheets

| FIELD | DESCRIPTION | SIZE (BITS) |
|---|---|---|
| 0 | AMI (PATTERN IS 11001100....) | 72 |
| 1 | CODEWORD (1111) | 4 |
| 2 | YARD ID (0-15) | 4 |
| 3 | MESSAGE TYPE | 8 |
| 4 | MISC. INFO (ALARM, I/O, SEQ. NUMBER, TIME SLOT GROUP) | 8 |
| 5 | ADDRESS (CONTAINS 18-BIT IDENTIFIER PLUS SOURCE/DESTINATION DEVICE) | 24 |
| 6 | APPLICATION BSP PAYLOAD DATA (7 BYTES) | 56 |
| 7 | CRC | 16 |
| Total | (24 BYTES) | 192 |

*FIG. 9*

SYSTEM AND METHOD FOR REMOTE CONTROL OF LOCOMOTIVES

The present application is a continuation of, and claims priority from, U.S. application Ser. No. 11/263,880 filed Nov. 1, 2005 for a "SYSTEM AND METHOD FOR REMOTE CONTROL OF LOCOMOTIVES" and from U.S. Provisional application 60/624,493 for a "SYSTEM AND METHOD FOR REMOTE CONTROL OF LOCOMOTIVES," filed Nov. 1, 2004, both of which are hereby incorporated by reference in their entirety.

The present invention is directed to the remote control of locomotives, and more particularly to various methods and apparatus employed in implementing systems for such remote control, and for maintenance and upgrade of such systems.

BACKGROUND

The following U.S. patent publications are also noted and hereby incorporated by reference for their teachings: US 20040114631 by Aiken et al., published Jun. 17, 2004, and 20040100938 by Aiken et al., and published May 27, 2004, both of which are directed to the wireless remote control of locomotives; and 20030151520 by Kraeling et al., published Aug. 14, 2003, and teaching a rail yard remote control system for locomotives.

The railroad industry, through the Association of American Railroads (AAR) has obtained the right to use radio spectrum in the 220 MHz band for remote locomotive control. The frequency allocation consists of at least two two-way radio channels. These channels are cleared nationwide and will be used for the Remote Control Locomotive (RCL) application. Additional channel pairs in the 220 MHz band may be used at specific locations where individual licenses have been obtained.

Coexistence of RCL systems within the same block of spectrum will require a coordinated, standard method for accessing the channel(s) within the spectrum block. This is paramount to implementations in the 220 MHz band because of the very limited availability of expensive, licensed spectrum. Due to this limited number of radio channels, railroads operating in the same area may be forced to use common channels and share the repeater infrastructure. Therefore, a prime motivator for an open protocol is interoperability among user railroads and among vendors. These two dimensions of interoperability are required to maximize efficient use of limited spectrum available for this application. Vendor interoperability in this context extends down to the system level. As used herein, the term system is intended to reflect at least a single controlled locomotive (locomotive control unit; LCU) and its associated controlling devices (operating control units; OCUs). In other words, it is not anticipated that a locomotive unit would be required to operate with a controller unit from a different vendor. By ruling out this level of interoperability, the open protocol need not define message content or other details of the interactions between locomotive and controller units. This not only simplifies the specification, but also leaves room for vendor differentiation and innovation.

SUMMARY

Contemplated in the present invention are systems and methods for not only reliable remote-control communications, but use of repeaters and communications servers to assure reliable, centralized communication between locomotives and operator control units. In another embodiment, there is described a reliable distributed communication mode using an uncorrelated time sequence that does not interfere with a time division multiple access network. Differentiation between the centralized mode and the distributed mode is accomplished by assessing whether a locomotive and control unit is within a rail yard's infrastructure. Moreover, reliability is assured by using a coordination server that dynamically routes packets between multiple satellite RCL repeaters based on received signal strength. Lastly, the present invention further contemplates the use of an out-of-band transmission to upgrade and test operator control units, thereby allowing for field maintenance and software upgrades.

All RCL systems deployed by a railroad, regardless of supplier, should be able to utilize a common, shared wireless infrastructure. Currently envisioned components of this infrastructure include repeaters and coordination servers. Shared use of a repeater will require use of a Common Air Interface (CAI), common system functions, and a standard message set for communication with a local configuration server.

The Common Air Interface (CAI) defines a reference point at which communications between radios can take place. In one embodiment of the present invention, this assumes that communications through the reference point are done at a gross bit rate of 9600 bps in a 12.5 kHz channel. In accordance with an aspect of the present invention, communication within an RCL system is based on the LCU and each OCU transmitting once a second at the proper time on a specific assigned frequency in the 220 MHz band. Listeners receive the transmitted message by receiving at the same time each message is transmitted.

In order to achieve reliable shared use of the assigned frequency, disclosed in embodiments herein there is described a scheme whereby each device using the frequency will know exactly when to transmit. This type of scheme is known as Time Division Multiple Access (TDMA). TDMA requires that a fixed period of time be divided into time intervals reserved specifically for transmissions from individual devices (e.g. OCUs or LCUs). For example, the time division multiple access proposed for RCL communications protocol provides multiple access to a radio frequency (RF) channel in the time domain.

In accordance with another aspect of the present invention, and as illustrated in detail below relative to FIG. 6, a repeating one second frame is divided into multiple time slots, with slots assigned to individual systems—one for the locomotive controller unit (LCU), and one for each of two operator control unit (OCUs). The basic TDMA frame for the RCL CAI repeats every second. This frame is divided into sub-slots that will be used by individual devices for their transmitted packet.

An RCL repeater, where used, is generally intended to include a fixed radio device that serves to increase the reliable range of operation of RCL Systems. The RCL repeater does this by re-transmitting radio transmissions it receives from LCUs and OCUs. Advantages achieved as a result of the use of a repeater include optimum antenna placement and elevation, extended coverage area, and avoidance of obstacles in the direct RF path between OCU and LCU. In the AAR specification, each unit must specifically direct its message to either a repeater or a peer device. Furthermore, the frequency pair is considered a channel. It consists of the repeater transmit frequency (the B frequency), and the LCU/OCU receive/transmit frequency (the M frequency). The basic function of an RCL Repeater is to receive transmissions on the M frequency of the channel, and, retransmit them on the B frequency of the channel. The RCL repeater will also process messages as an Repeater Coordination Server (RCS) when multiple repeaters are used in a yard.

A Repeater Coordination Server (RCS), where used, is a process/system that implements the logic necessary to coordinate the communications of multiple repeaters and RCL Systems in an RCL operation. Embodiments of the present invention contemplate multiple RCL Systems using repeaters controlled by an RCS. The RCS coordinates the operation of multiple repeaters by dynamically routing repeater transmissions. The physical configuration of some yards may make it necessary to install multiple repeaters. In this situation the RCS will provide message routing and slot synchronization among the repeaters.

There are two modes in which channel and time slot usage is coordinated between RCL systems utilizing the RCL common air interface, Distributed and Centralized. Each mode utilizes the TDMA frame structure described above.

As will be further described relative to FIG. 2 below, an RCL system operates in Distributed Coordination Mode (DCM) when it is not in coverage of available repeater infrastructure. This mode is generally applicable where RCL demand is light or OCUs and LCUs are capable of reliable communications without repeaters. Typical locations for DCM operation are in small yards or industries along the railroad line. In DCM, individual RCL system devices contend for and self-regulate shared usage of available radio channels.

An RCL system operates in Centralized Coordination Mode (CCM) when its LCU and OCU devices communicate directly or via Repeaters in slots coordinated by the Repeater infrastructure. This is the default mode of operation when infrastructure is available. The Repeater infrastructure provides expanded communications coverage as well as broadcast information about channel and time slot availability for use by initializing RCL systems. By monitoring the repeater's broadcast transmissions during initialization, an RCL system can intelligently choose a channel and time slot that will be free of interference from other operating RCL systems.

In situations where the concentration or frequency of RCL activity does not justify coordinated repeater infrastructure, RCL systems will operate in Distributed Coordination Mode (DCM). DCM operation can be used anywhere and should therefore be restricted to the two nationwide channels. In DCM, the LCU and OCUs communicate directly with one another.

In accordance with the present invention, there is provided, a system and method for remote control of locomotives, comprising: a highly reliable time division multiple access network; at least one locomotive equipped so as to be operatively controlled by a locomotive control unit (LCU) suitable for transmitting and receiving information via the network; at least one operator control unit (OCU) suitable for transmitting and receiving information via the network, wherein the LCU and OCU each device will only transmit in a defined period of time; and said network employing both spatial and frequency diversity for remote control using repeater infrastructure, wherein said network further comprises an Repeater Coordination Server (RCS) to implement logic to coordinate the communications of multiple repeaters and RCL Systems and where said RCS will include at least one repeater to provide spatial diversity in that the path to any mobile or portable unit (LCU or OCU) is different for each repeater, and each time the repeater receives a message from an LCU or OCU, it calculates a rating for the message integrity (Received Signal Strength Indication; RSSI) and sends the message and rating to the RCS using an Inter-Access Point Protocol (IAPP) over an off-channel backhaul link where the message is stored, the RCS using the stored message information to determine which repeater has a best path to the destination unit for the current message, and forwards the message to this repeater for retransmission.

BRIEF DESCRIPTION OF THE DRAWINGS

FIGS. 9 and 11 illustrate exemplary message formats;

Figure 1:
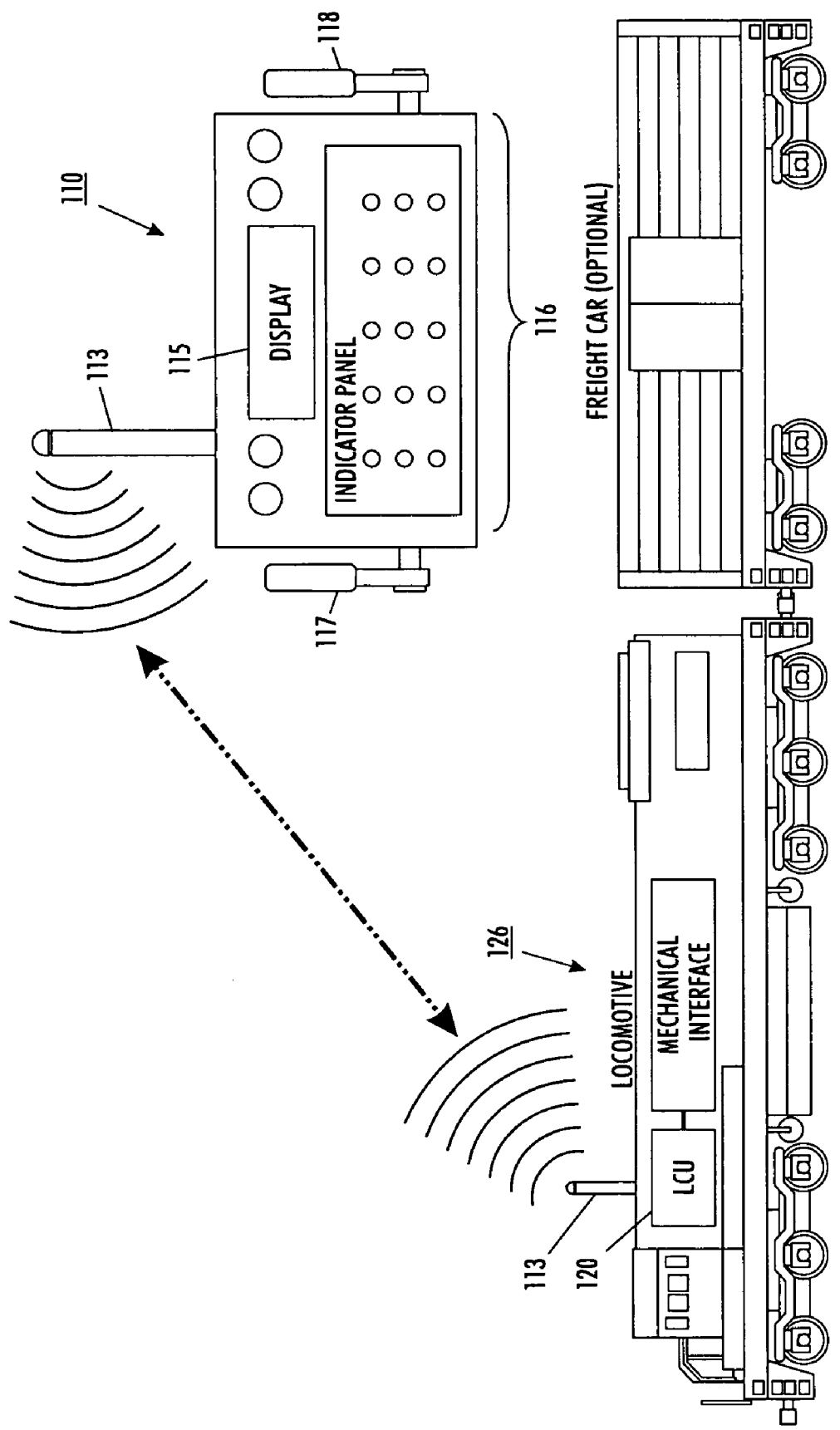
FIG. 1 illustrates an exemplary embodiment of the basic communications devices in accordance with a direct communication aspect of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The description of the present invention incorporates many acronyms and terms that are, unless otherwise stated, are generally defined as follows:

Term Definition

Association The process by which OCRs establish a radio communications link with an LCR B Frequency Base (repeater) transmit frequency CCM Centralized Coordination Mode Channel A pair of frequencies, B and M, used for wireless RCL communications DCM Distributed Coordination Mode FCS Frame Check Sequence Frame A period of one-second divided into a sequence of 47 timeslots in which TDMA transmissions may occur Infrared A process/technology by which OCUs obtain the configuration
Linking necessary to operate with the LCU.
Repeater The permanently installed system of intercommunicating
Infrastructure repeaters and their supporting network that serves to route messages between portable radios operating within its geographical limits.
Kiosk A station at which portable radio units may be upgraded or tested.
LCR Locomotive Communications Radio, associated with an LCU
LCU Locomotive Control Unit
M Frequency Mobile transmit frequency (RCT and RCL)
OCR Operator Communications Radio, associated with an OCU
OCU Operator Control Unit
Primary OCU The main OCU used for controlling the RCL.
RCL System The set of logical units including an LCU and up to two OCUs.
RCS Repeater Coordination Server
Repeater A set of one or more repeaters operating in a coordinated manner
Community to provide extended geographical coverage.
Secondary OCU The auxiliary OCU used for controlling the RCL.
Slot Basic time element in TDMA frame allocated/used by a single device
Slot Group Set of three TDMA timeslots on both the M- and B-frequencies of a channel used by a group of logically-associated RCL devices comprising a single RCL system (LCU, OCUa, OCUb)

As depicted in FIGS. 1 through 8, each Remote Control Locomotive (RCL) system includes at least a locomotive control unit (LCU) and one or more operating control units (OCUs). Each LCU radio is responsible for management of the radio mode for the units in each RCL system. Operation of each LCU and its associated OCUs is accomplished in accordance with a control architecture that includes a controller and locomotive interface. An exemplary illustration of such a system is found, for example, in FIG. 1. In FIG. 1, the OCU 110 is illustrated and includes a housing 111, that further includes a controller (not shown) and a radio (not shown) having an antenna 113, along with a display 115, an indicator/switch panel 116, a brake lever 117, a throttle lever 118. The OCU controller generates signals that are transmitted via the radio to the LCU 120 as will be described in detail below. The controller of Operator Control Unit (OCU) 110 in each unit operates in response to an operator's selection on the levers and switches, and in accordance with a set of pre-programmed instructions, to provide such features as Increase/Decrease Throttle, Apply/Release Brakes, change between Forward/Reverse, and Sound Horn/Bell in the Locomotive Control Unit (LCU) 120. As will be appreciated, LCU 120 is has a similar controller and radio connection and is mechanically connected or interfaced with the conventional control mechanisms in a locomotive 126 in order to provide both manual control, and/or override, of the remote-control devices.

Figure 2:
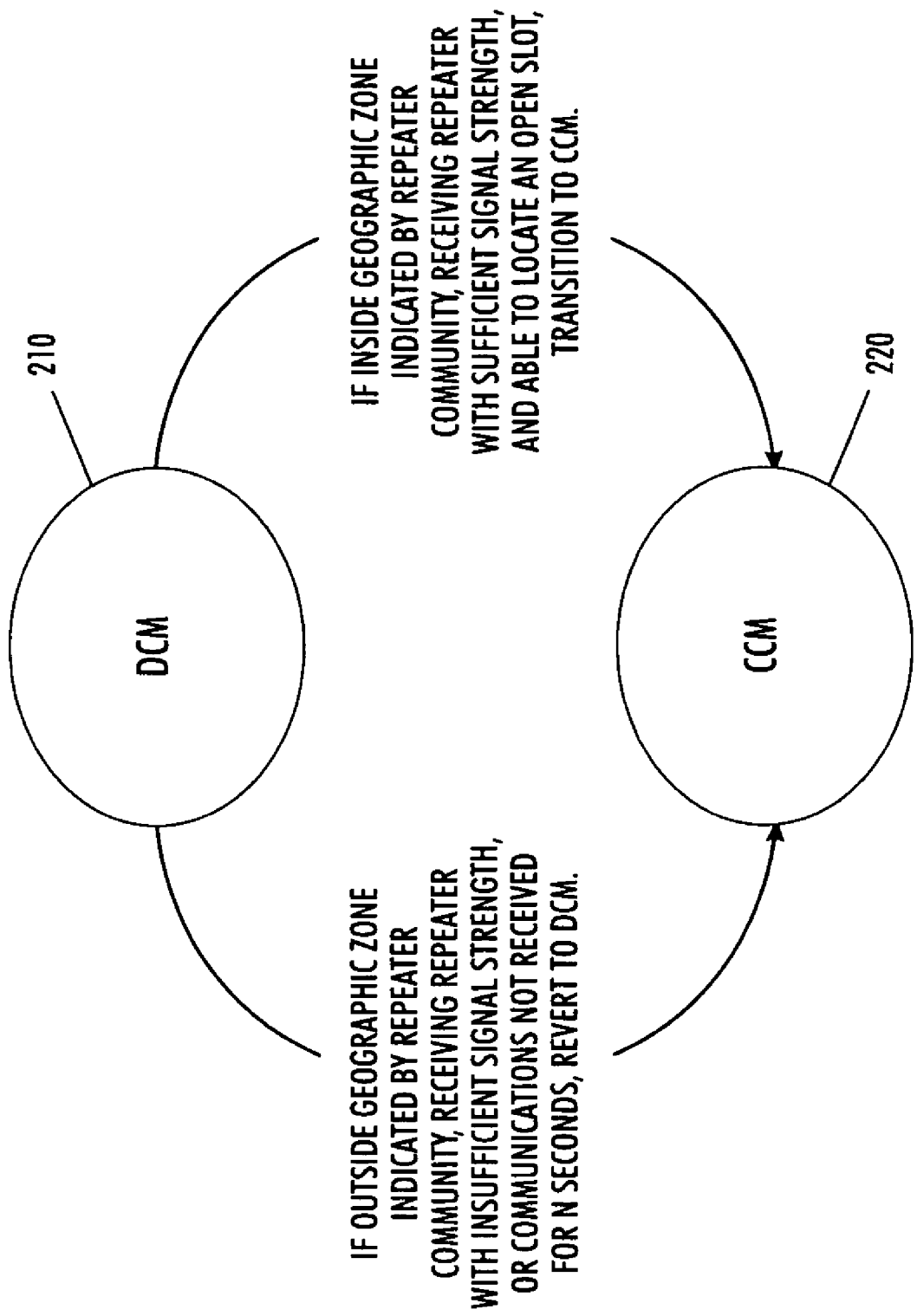
FIG. 2 is a simple state diagram illustrating the two primary modes in which the remote control locomotive system may operate in accordance with the present invention.
Figure 3:
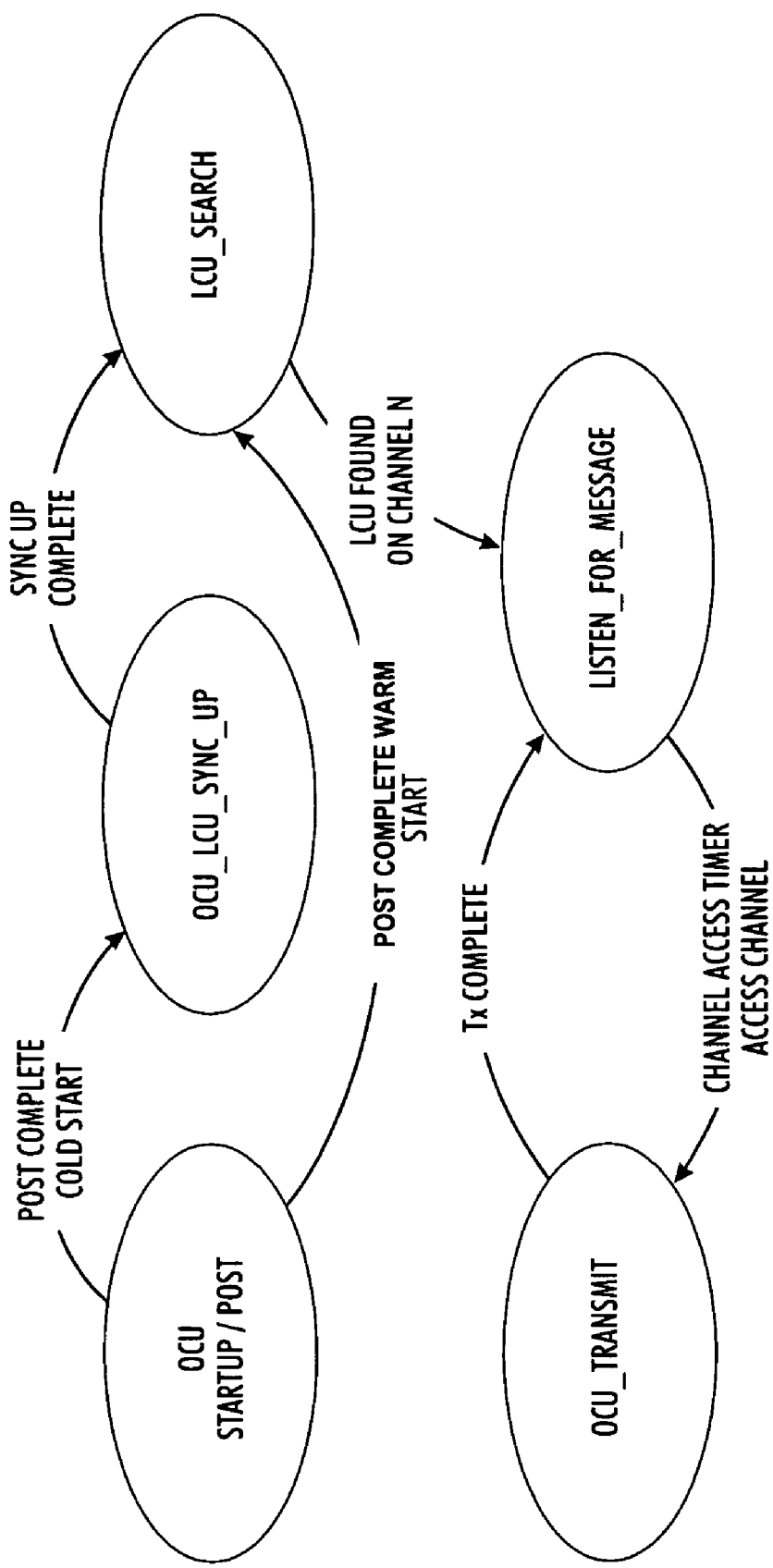
FIGS. 3 and 4 are illustrative state diagrams depicting the basic operation of the operator and locomotive control units of FIG. 1.
Figure 4:
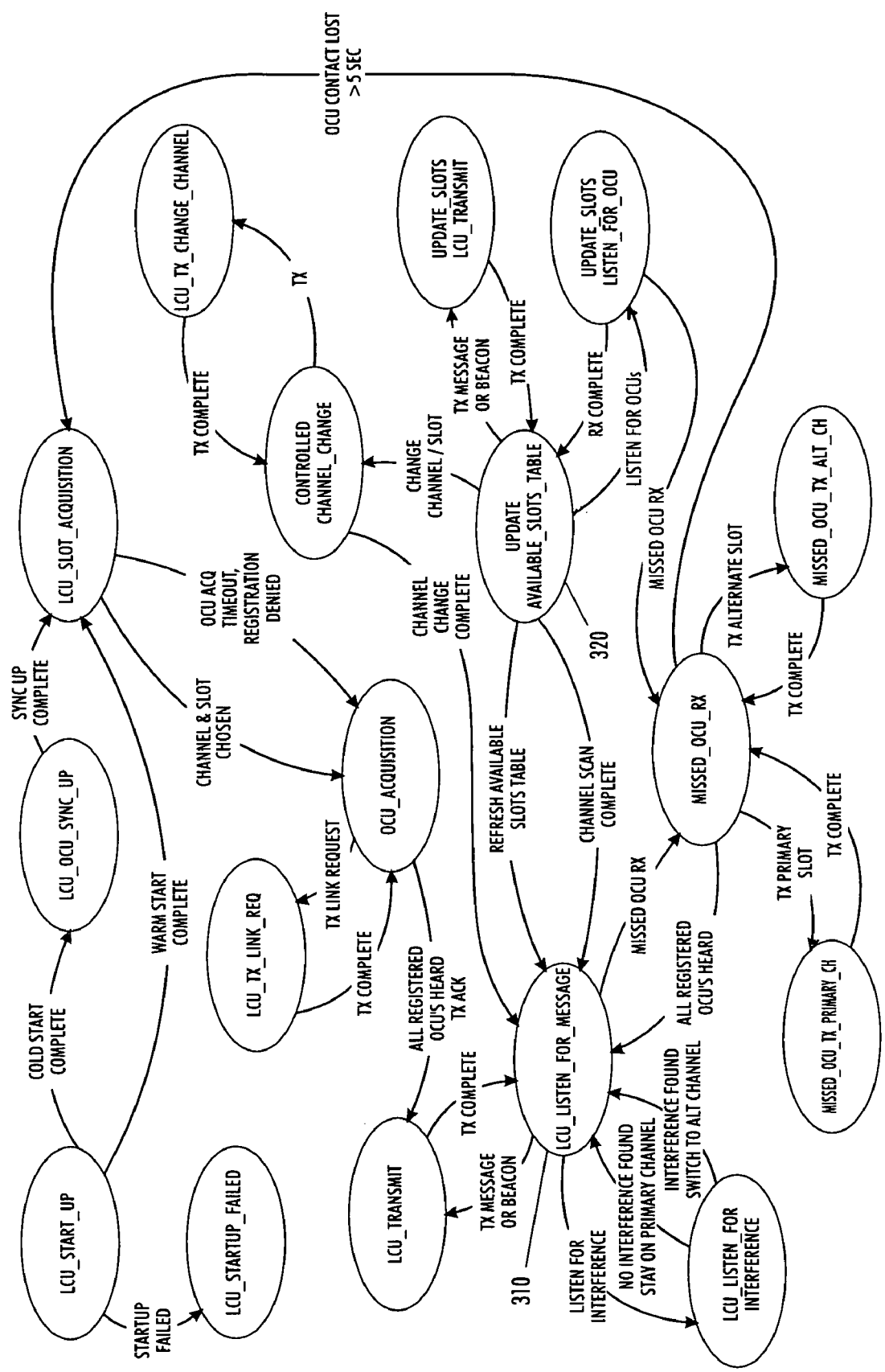
Figure 5:
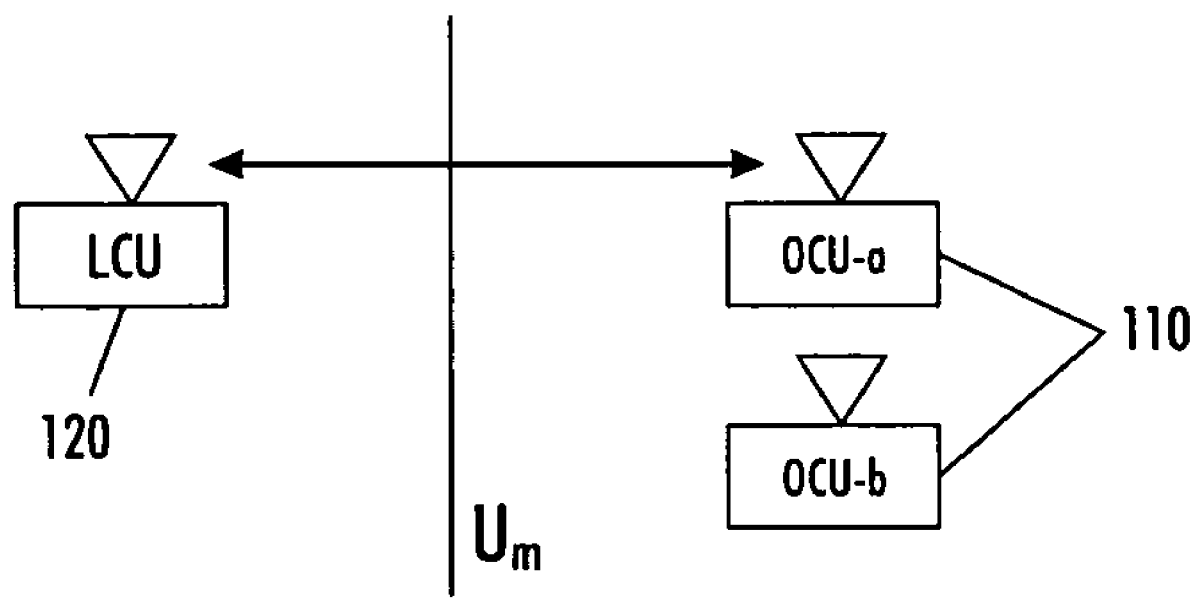
FIG. 5 is a general illustration of a common air interface and associated reference point.
Figure 10:
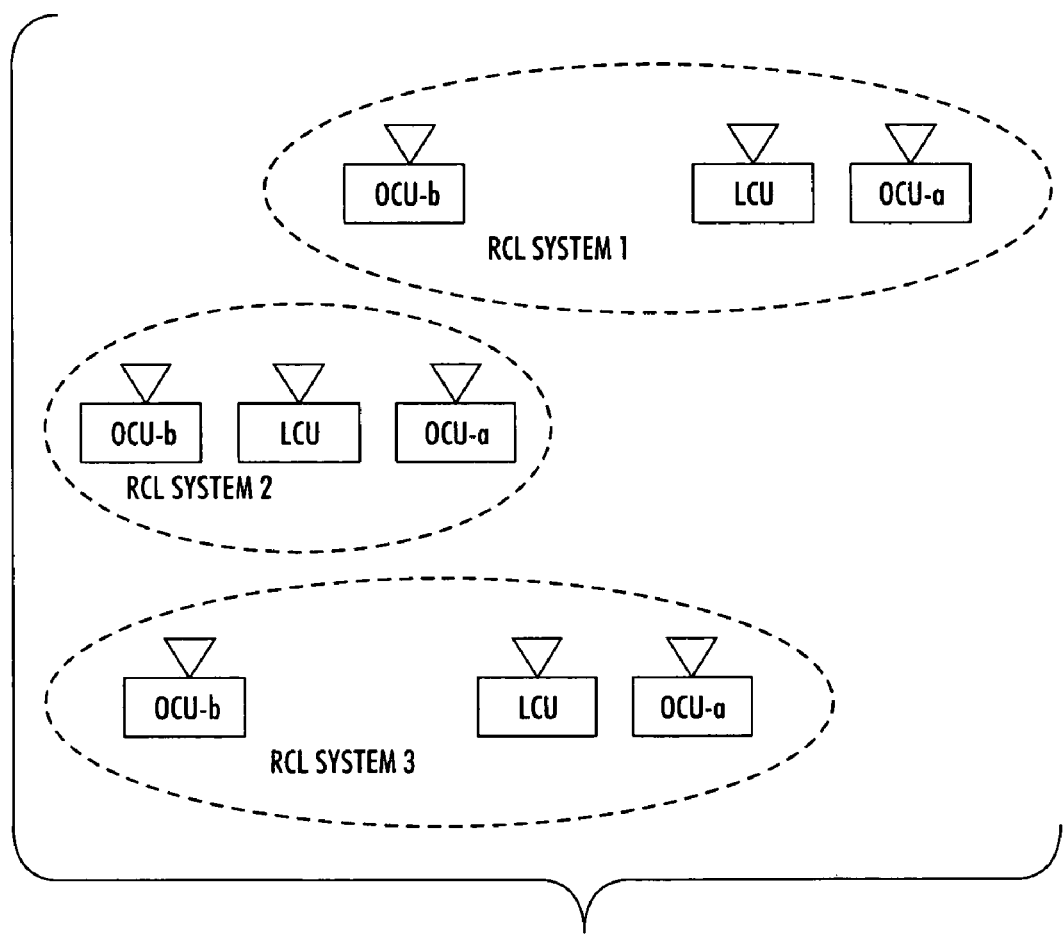
FIGS. 10 and 12 respectively illustrate distributed coordination mode and centralized coordination mode operation of the present invention.
Figure 11:
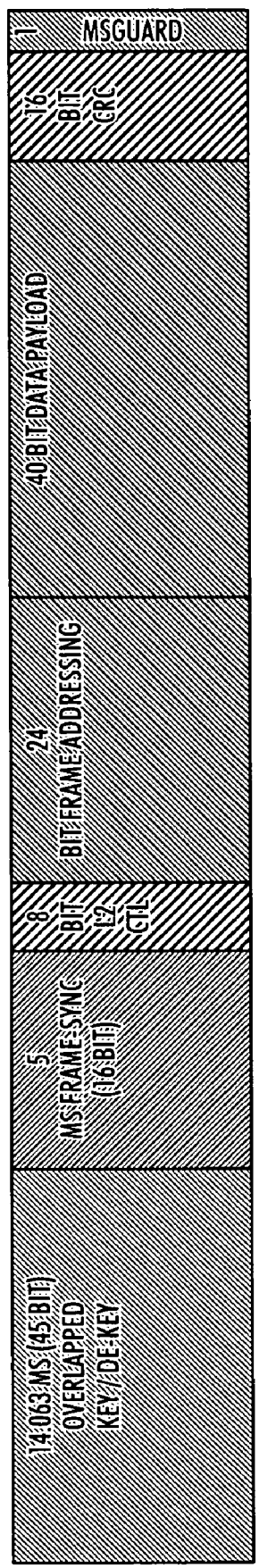
Figure 12:
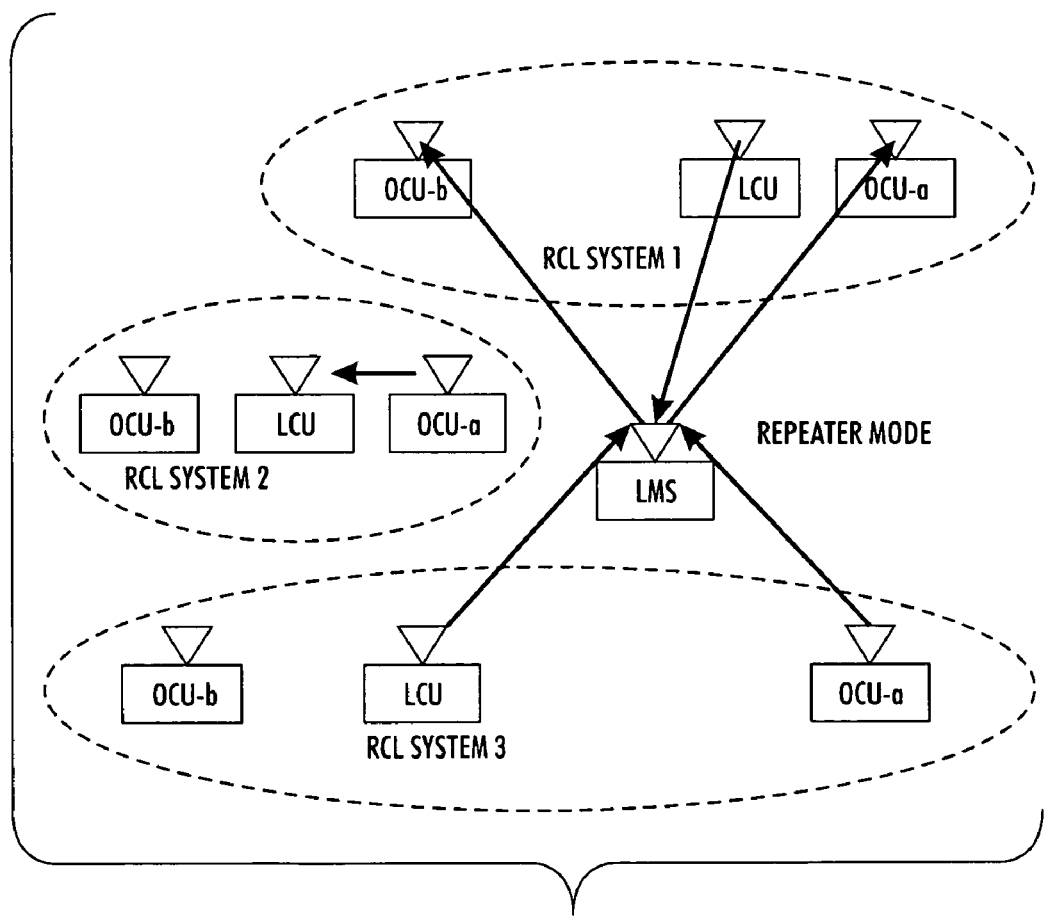

The basic operation of the OCU and LCU are illustrated by the state diagrams depicted in FIGS. 3 and 4, respectively. When the LCU 120 is ready to establish communications with the associated OCUs 110, it will listen (210) on one of the frequencies assigned for RCL operation for Repeater Infrastructure. If no Repeater Infrastructure is detected at 310 the LCU will enter distributed coordination mode (DCM) operation (210) as generally depicted in FIGS. 2, 10. If the LCU detects infrastructure but no time slots are available on the two nationwide frequencies (320), the LCU will check two secondary local frequencies (as indicated by the original repeater system) for available slots. The LCU will continue to monitor the infrastructure in case slots become available, at which point it will transition to centralized coordination mode (CCM) operation (220) as depicted in FIGS. 2, 12.

The criteria the LCU will use to determine if the infrastructure heard is acceptable are two-fold. First, the LCU must receive a strong enough signal from a Repeater within the infrastructure. Second, the LCU must be within the broadcast geographical bounds of the Repeater Community. This is to prevent ambiguity as to which infrastructure to join if there is transient, overlapping coverage by two communities due to a propagation enhancement.

The LCU will select an unused time slot and begin transmitting payload data addressed to its OCUs in that time slot. The payload data consists of five data bytes and two Checksum bytes, which are not part of this patent application and are unique to the RCL vendor integrating with this system. This acts as a time slot request to the Repeater. To acknowledge the LCU has been granted the time slot, the repeater will begin retransmitting the LCUs payload. The LCU listens for this to occur within a time period to confirm that it has been granted a slot. The repeater can instead transmit a deny message on the frequency and in the time slot normally used for repeating the LCU's traffic.

The OCUs will listen on each channel until they hear their LCU transmitting or the retransmitted message via the Repeater. Upon hearing the LCU's messages, each OCU will calculate the time slot to use on the channel based upon the time slot used by the LCU, and begin transmitting. The LCU will then hear the OCU transmissions and communication will have been established between the LCU and OCUs in the RCL System.

Figure 6:
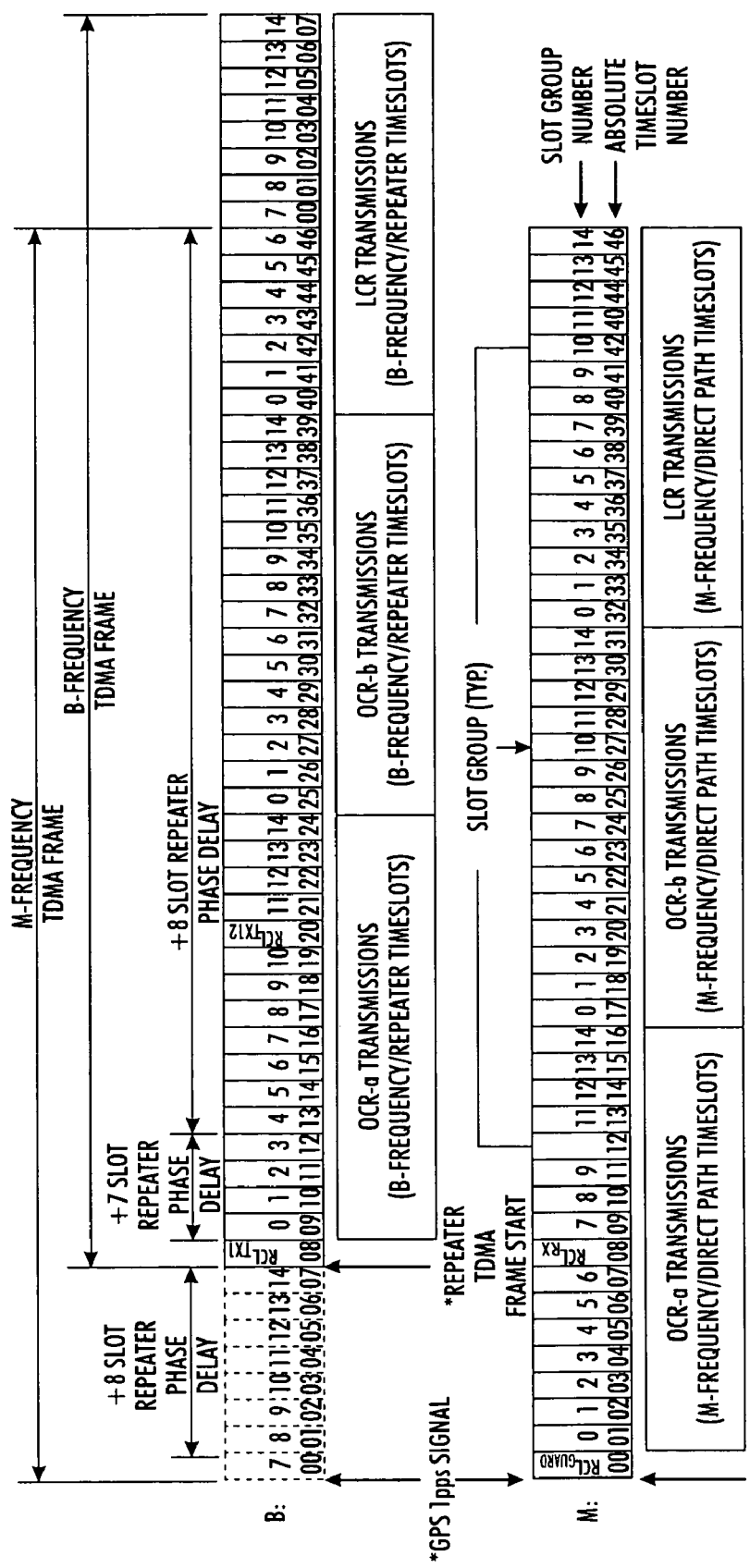
FIG. 6 illustrates an exemplary TDMA cycle and associated division of time slots therein.
Figure 7:
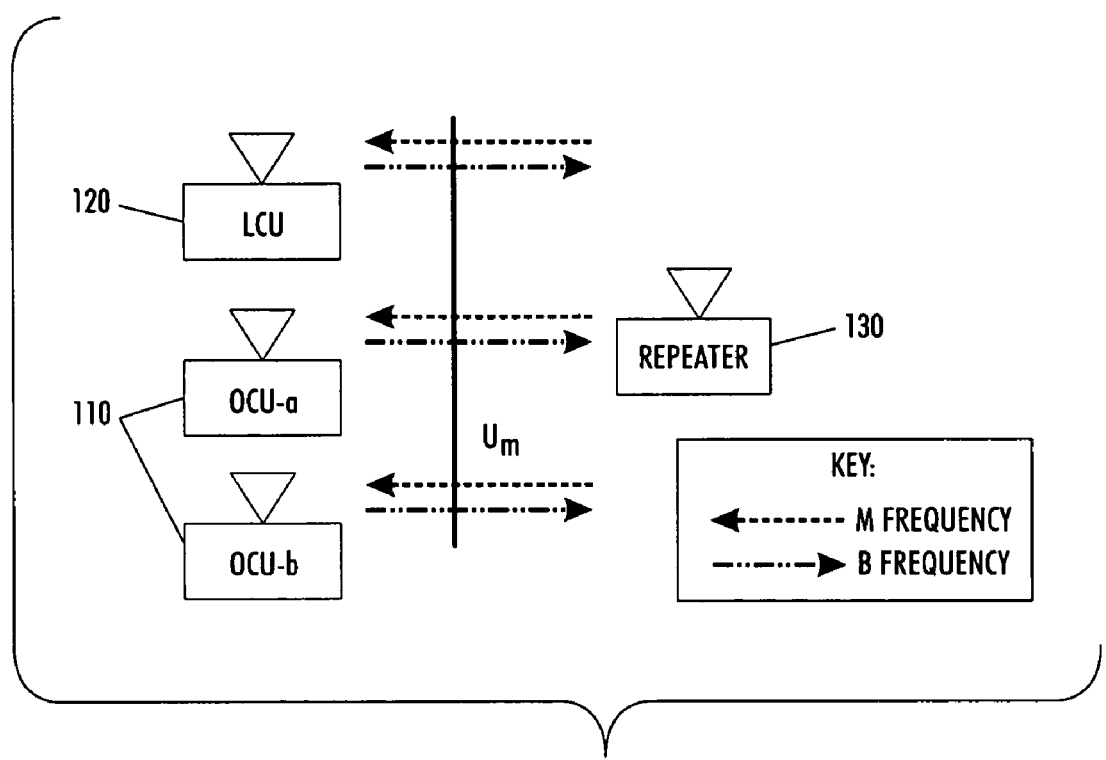
FIG. 7 is an illustrative representation of the RCL repeater communication process in accordance with an aspect of the invention.

As an illustration of the TDMA scheme employed in accordance with an aspect of the present invention, and as depicted in FIG. 6, a repeating one-second frame is divided into multiple time slots, with slots assigned to individual systems—one for the Locomotive Controller Unit (LCU) 120, and one for each of two Operator Control Units (OCUs) 110. This frame is divided into sub-slots that will be used by individual devices for their transmitted packet. Based on a 120-bit packet and a data transmission rate of 9600 bits per second, there will be forty-seven sub-slots in each frame. Each RCL System needs three sub-slots. The sub-slots for an RCL system will be distributed across the TDMA frame. The group of three sub-slots used to support the communications of an RCL System will be called a slot. One slot is reserved for repeater use in coordinating channel access. Therefore, fifteen RCL Systems (meaning up to fifteen LCUs with associated OCUs) will be able to share use of each radio channel.

RCL systems operate in Distributed Coordination Mode (DCM) in locations where repeater infrastructure and coverage does not exist. Nationwide availability of the 220 MHz RF spectrum allows RCLs to operate on licensed spectrum anywhere in the United States. Interference possibly resulting from the operation of multiple RCL systems in DCM within the same coverage area is minimized through use of a unique pseudo-random TDMA "DCM slot hopping" mechanism. This slot hopping sequence consists of a series of radio channels and timeslots through which the RCL system will advance with each transmitted packet. Transmission "hops" from slot to slot, allowing multiple RCL systems to avoid channel and time slot collision with probabilistic certainty.

The DCM slot-hopping sequence consists of a sequence 29-long of channel and timeslot group identifiers that previously-associated LCU and OCU devices will cycle through for each packet transmission and receipt. The sequence is pre-coordinated between LCU and OCU devices and both step through the sequence, advancing the position in the sequence once per TDMA frame instance, in synchronized fashion, in order to coordinate transmission and receipt of packets. The sequence allows hopping amongst four pre-configured channels and fifteen timeslot groups (0-14) as depicted in FIG. 6, for example. Each item in the sequence defines the channel and timeslot group on which packet activity is to occur within the current TDMA frame.

As may be appreciated, the DCM slot-hopping pattern is used to maximize the number of RCL systems that can operate in the same coverage area without coordination. In Decentralized Coordination Mode (DCM), the transmitting LCU and OCUs send two messages during any one-second period. One message is sent on the channel "M" frequency and the other on the "B" frequency. Further, transmission hops to another slot from frame to frame, so interference between a given pair of RCL systems does not repeat. The frequency pair on which packets are sent changes for each TDMA frame. By using both the M and the B frequencies to send messages each second, the system benefits from frequency diversity that significantly reduces the fade margin required for reliable operation.

In Centralized Coordination Mode (CCM), the LCU and OCUs send each message using two independent paths each second, to reduce fade margin and creating space and frequency diversity—thereby improving the probability of packet success. The first path is a direct transmission between the LCU and each OCU radio. The second path is via the Repeater, which may enhance coverage and received signal strength at the receiver. The Repeater receives transmissions on the M-frequency of the channel, and retransmits them on the B-frequency of the channel. Having this diversity significantly reduces the RF fade margin required for reliable operation.

For example, in DCM state, the LCU sends a Repeater Timeslot Request with Yard ID value set to that in the received Repeater Beacon data. When the LCU is located within the geometric shape described in the received Repeater Beacon Data, the received signal strength of the Repeater Beacon Data packet(s) exceeds a railroad- or manufacturer-defined threshold value; and a Repeater Timeslot Request issued by the LCU for this Yard ID and shape (FIG. 16) has not previously been denied since the LCU was last initialized for communications. As further reflected by the DCM state, the Repeater_Timeslot-Request message will be sent in the LCU's DCM timeslot, in lieu of any other DCM information packet. The repeater infrastructure will respond to the timeslot request during its normal beacon timeslot.

Figure 8:
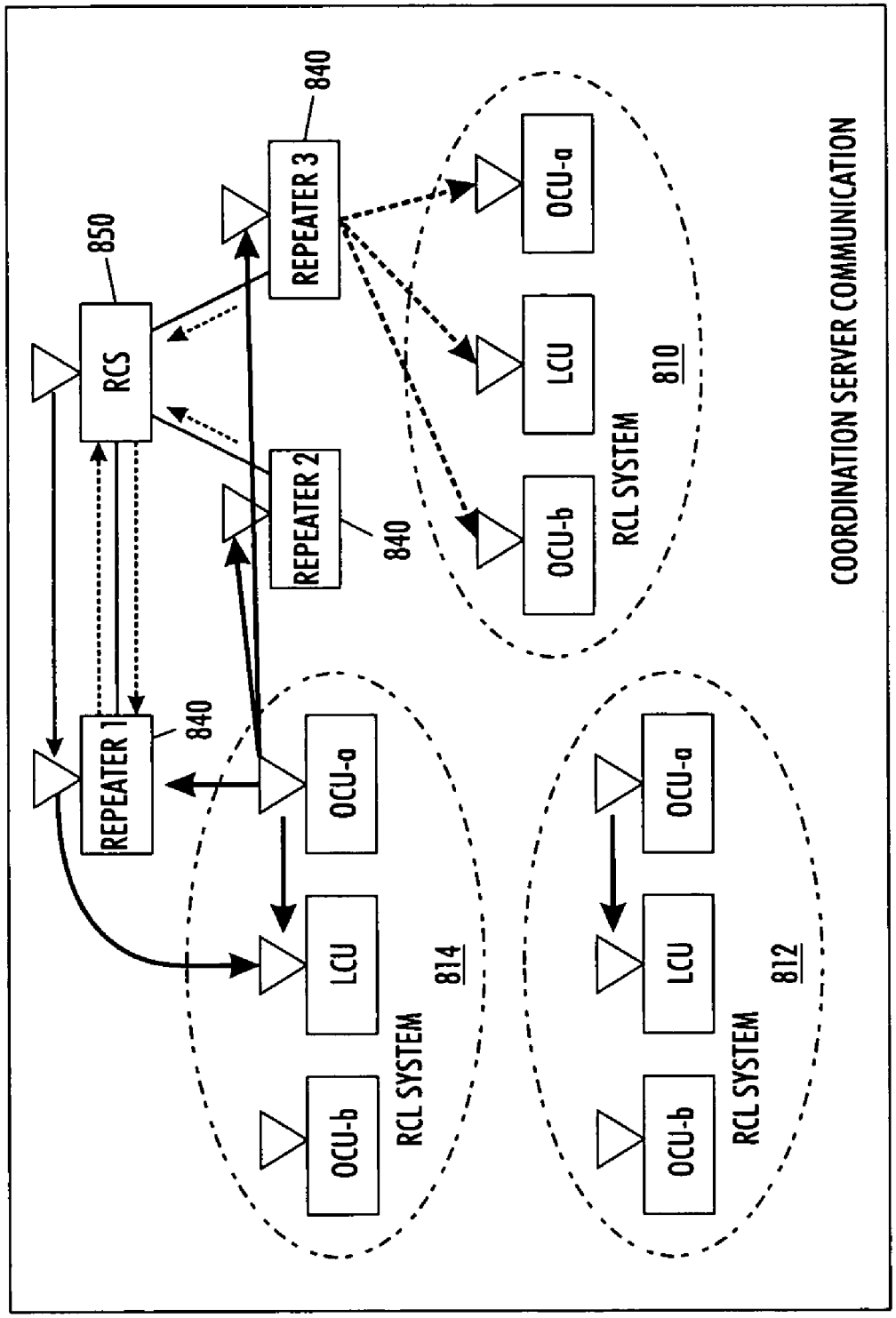
FIG. 8 illustrates multiple RCL Systems using repeaters controlled by an RCS.

For example, in the operation of the Central Coordination Mode with a single independent repeater, such as in FIG. 8, the LCU in System 810 is using both the repeater and direct paths to send a message that will be received by OCU-a and OCU-b of System 810. System 812 shows OCU-a communicating directly with the LCU illustrating that the repeater does not have to be used for all transmissions. System 814 shows OCR-a using the direct path and the repeater path to retransmit a message intended for the LCU.

Each TDMA frame has two slots (00, 12) reserved for beaconed information. In each Beacon slot, the repeater transmits information about its coverage area and available slots on the channel. This transmission allows LCUs operating in DCM to discover the repeater and transition modes when in range to utilize the repeater. At a minimum, the infrastructure may operate on one channel. In addition, the infrastructure can communicate which timeslots are available on one other channel. Further, the infrastructure can communicate the frequencies for two additional channels (without timeslot information) so that RCL systems can change frequencies and operate there.

In areas where the concentration or coverage requirement of RCL systems requires more than one repeater to achieve coverage, a Repeater Coordination Server (RCS) may exist to interconnect and coordinate transmissions of multiple repeaters. It is crucial for only one repeater to transmit on a channel in a given time slot to prevent message loss due to repeater transmission collisions. In this scenario, time slot assignments and tracking are handled centrally by an RCS, which directs two or more repeaters.

An RCS enables all the repeaters to receive a message and have it transmitted by a repeater relay capability. This expands the coverage area available for RCL operation. In an embodiment that combines use of repeaters equipped with diverse receivers plus the direct path capable of hearing each OCU or LCU transmission, there are 2N+1 paths, potentially improving system availability.

FIG. 8 also depicts the operation of an RCL system in a multiple repeater environment with an RCS 850. In the example, all three repeaters 840 receive the transmitted packet from OCU-a and pass it to the RCS function. The RCS function then evaluates which repeater currently "tracks" the destination device (the locomotive) with greatest signal strength (Repeater1) and routes the packet for re-transmission. An RCL system may also operate within repeater coverage in DCM mode.

If available, repeater Infrastructure will be used by each unit to transmit messages to other units. This does not mean, however, that a message must travel to its destination through a repeater. In accordance with the present invention, there are two opportunities for a message to arrive at its destination. First, the message may arrive directly as it is transmitted on the repeater receive frequency M, and second it may arrive when it is transmitted by the repeater on its transmit frequency, B.

In other words, each unit listens during a predetermined time slot on the repeater receive frequency M. If this message is received directly, then it is used. If not, the unit has another opportunity, on a predetermined later time slot, to hear the message on the Repeater's transmit frequency B. This gives spatial, time, and frequency diversity in the communication because the paths between the sending and receiving unit and the repeater are uncorrelated, the repeater's receive and transmit frequencies are uncorrelated, and the time difference between the predetermined slots are uncorrelated. The receiving unit has knowledge of, but does not rely on which path the message takes. In previous designs for a similar system, the system mode was dependent on a great deal of a priori knowledge of the current radio propagation and system state, and communications could only take place using one path at a time. In addition, because propagation conditions are rapidly changing in an application such as a rail yard, traversing a complicated state machine to change modes is impractical. In one embodiment of the current invention, there is no dependence on this type of information, and the system can effectively utilize both direct and repeated (sent through repeater) communications in typical use. The current invention maximizes the reliability of communications by using both the direct and repeated path in CCM.

As described above, the LCU, or more specifically, the radio associated with the LCU, in each RCL System is responsible for slot selection for the system based on beacon information. The LCU knows the relative signal strength of the infrastructure signals detected, and if it is within the repeater coverage based on the geographical coverage zone transmitted by the repeater beacons. The LCU should use a make-before-break connection rule in switching modes, from DCM to CCM or CCM to DCM modes, to minimize message loss during mode transition.

As indicated in FIG. 2 in conjunction with FIGS. 3 and 4, transition from CCM to DCM occurs when the RCL system physically leaves the defined geographic limits of a repeater coverage area and/or other manufacturer-specific criteria (e.g. received signal strength, etc.). When an LCU begins transition to DCM, it first signals its intent to do so to its associated OCUs. Upon successful transition, the LCU and OCU communicate via the DCM slot-hopping scheme as defined for DCM. In one embodiment, the RCL system effectively "abandons" its slot on the repeater channel. The LCU should only abandon its CCM time slot once the DCM connection has been established between LCU and OCU.

The LCU also continuously monitors for repeater beacon information during times when it is not otherwise monitoring for transmissions from its associated OCUs. When an RCL System approaches a CCM area, as defined by the beacon information fragments and at better than some predetermined threshold signal strength, it may request and receive authorization to utilize the repeater infrastructure. If the RCL system is not authorized to use the infrastructure then it will remain in DCM coverage. Policy for granting authorization to utilize repeater infrastructure is railroad- and manufacturer-defined.

The following algorithm may be used by the Repeater Coordination Server (RCS) to route messages at time t from Unit A to Unit B where Units A and B could be an LCU and an OCU, or an OCU and an LCU respectively. The path P(t) for the message at time t is via repeater R(n). The Received Signal Strength Indication (RSSI) of the last message heard from Unit B (the destination of the message at time t by Repeater n is RSSIB(n,t−1), and $P(t)$=Repeater $R(n)$ where RSSIB(n,t−1) is the maximum over all n repeaters. This is the "best path".

For example, consider the following table (Table A):

TABLE A

| Repeater n | RSSI of Unit A at time t-1 | RSSI of Unit B at time t-1 |
|---|---|---|
| 1 | −70 | −60 |
| 2 | −100 | −30 |
| 3 | −80 | −90 |

In this example, the RCS would select Repeater 2 because RSSIB(2,t−1) is the highest value. The present invention also includes a feature where an RSSI threshold ($RSSI_{th}$) can be set at the RCS such that a new routing algorithm is implemented:

$P(t)$=Repeater $R(n)$ now where RSSIB(n,t−1) is the maximum value below $RSSI_{th}$ over all n repeaters or the maximum value above $RSSI_{th}$ if there are no values below $RSSI_{th}$. This prevents using paths that are "too strong" when the RSSI is non-linear over a threshold RSSI level.

Figure 13A:
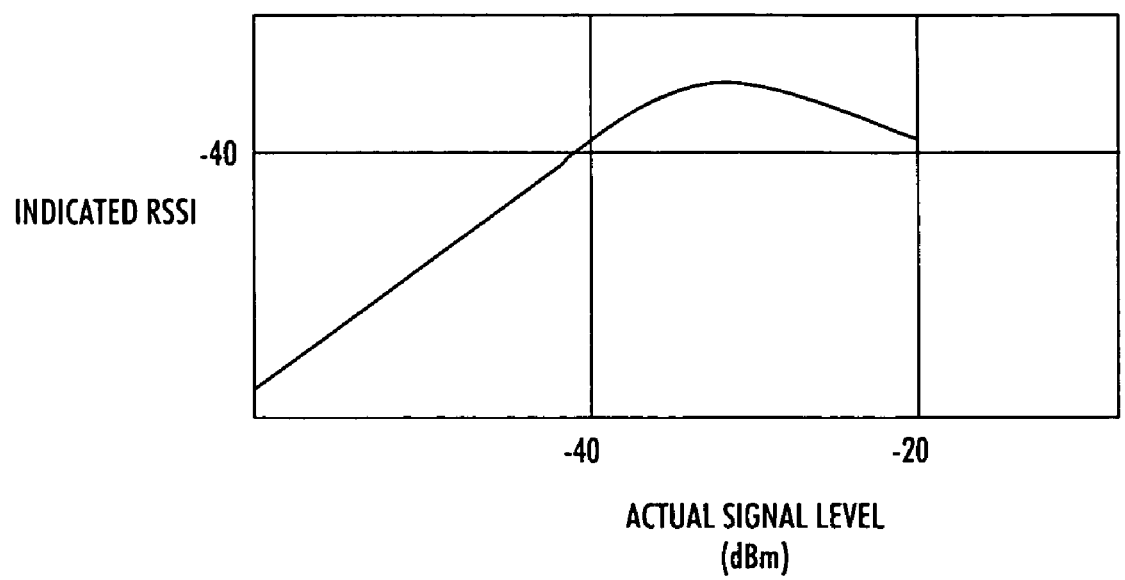
FIGS. 13A-B are illustrative examples of Received Signal Strength Indication curves in two alternative embodiments of the invention.

The RSSI reading is, in one embodiment, based upon a hardware circuit that saturates and even folds-over when the signal level is strong enough, as shown, for example, in FIG. 13A. In the above example, readings over −40 dBm cannot be trusted to be accurate. They could represent values between −40 and −20 dBm. $RSSI_{th}$ would be set to −40 in this case. For example, consider the following table (Table B):

TABLE B

| Repeater n | RSSI of Unit A at time t-1 | RSSI of Unit B at time t-1 |
|---|---|---|
| 1 | −70 | −60 |
| 2 | −100 | −30 |
| 3 | −80 | −90 |

In this example, the RCS would select Repeater 1 because RSSIB(1,t−1) is the highest value which is below $RSSI_{th}$ (−40).

Now consider a second example (Table C):

TABLE C

| Repeater n | RSSI of Unit A at time t-1 | RSSI of Unit B at time t-1 |
|---|---|---|
| 1 | −70 | −35 |
| 2 | −100 | −30 |
| 3 | −80 | −37 |

In this example, the RCS would select Repeater 2 because there is no RSSIB(n,t−1) below −40 and RSSIB(2,t−1) is the highest value. This gives the highest likelihood that the selected repeater does indeed have the strongest signal.

Figure 13B:
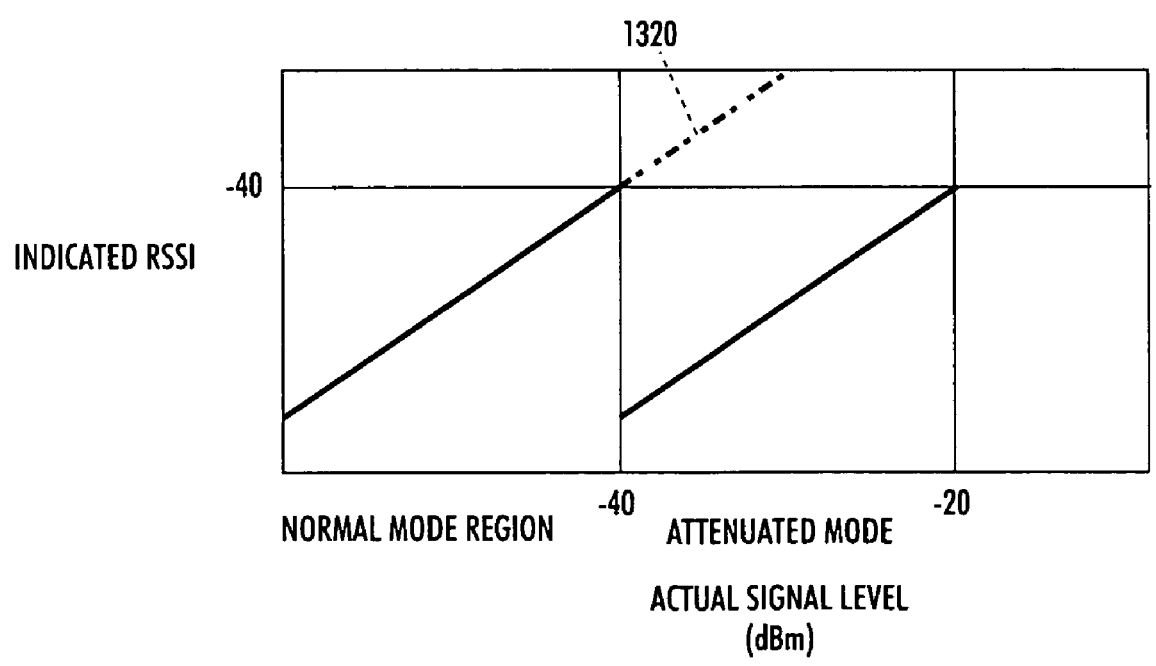

The present invention further contemplates modifications relative to the Automatic Gain Control to combat RSSI Saturation and Fold-Over as mentioned above. As noted, the Indicated RSSI reading can saturate and fold-over as shown in FIG. 13A. This causes ambiguity above a certain RSSI level. Accordingly, the invention further contemplates a modification to the receive circuitry to have both a Normal Mode and an Attenuated Mode. In the normal mode that operates below the saturation threshold, the signal path is not attenuated and the RSSI matches the actual signal level. Otherwise, once the receive circuitry detects that the RSSI is approaching the saturation level it switches to attenuated mode. This drops the signal level so that it again is in the non-saturated region of the receiver. An offset is added in software to make the RSSI reading follow the expected linear curve even with the attenuation switched in. This is shown as the dashed line 1320 in FIG. 13B.

If no repeater is detected with a signal stronger than the desired received signal strength indication (RSSI), or the LCU determines it is not within the bounds of a rail yard (see below), the LCU will transmit with a known random sequence on time slots on the M and B frequencies of both the nationwide channels. This method provides reliability through frequency diversity and does not require any coordination between units operating in CCM and DCM mode (e.g., FIG. 2). There is minimal interference between CCM and DCM units because of the random nature of the timing and frequencies used in DCM. Interference is limited to one slot at a time because although random, the time slots used are timed to coincide with infrastructure time slots. This means that only one infrastructure slot is occupied, instead of two, at once due to time overlap.

When an RCL System is operating in DCM and it detects that it has entered an area covered by infrastructure, it will transition to CCM while still maintaining communications. Only when both the LCU and OCU have completed the transition will the DCM message pathway be abandoned. In this way, the transition is seamless and no data is lost. Duplicate messages are never output from the radio system because of sequence numbers built into the message. As an example, FIG. 9 illustrates the format of a message.

A Repeater Coordination Server (RCS), where used, provides coordination and control of the communications of multiple repeaters deployed in a coverage area. FIG. 8, as noted above, illustrates multiple RCL Systems 810 operating in a multiple-repeater (840) configuration controlled by an RCS 850. The RCS coordinates transmissions in such an environment by routing traffic between repeaters such that only one repeater transmits during a given time slot. The RCS may be implemented within the software of one or more of the physical repeaters 840 or may be implemented in a separate device. Additionally, the RCS and its ground interconnections must be of sufficient performance to ensure that received messages are delivered to the destination repeater in time for transmission on the correct time slot.

The RCS infrastructure will consist of repeaters ranging in number from 1 to N. The channel is broken into forty-seven time slots per second. The repeater uses the pulse per second (PPS) from a GPS receiver to synchronize time slots of all repeaters on a one second basis. Although a GPS pulse is employed, it will be appreciated that alternative pulses or time synchronizations signals may be employed.

The N synchronized repeaters provide branch N spatial diversity in that the path to any mobile or portable unit is different for each repeater. Each of the N repeaters in the system receives all transmitted packets over the air from the LCU and OCU given they have sufficient signal levels. A cyclic redundancy code (CRC) is checked for each received packet and correct packets are tagged with their RSSI level. RSSI being the Received Signal Strength Indication, characterized in dBm.

Each time each repeater receives a message from an LCU or OCU, it sends the message and it's RSSI to the RCS using an Inter-Access Point Protocol (IAPP) over an off-channel backhaul LAN link. The RCS receives these messages and builds a table for all units heard and their RSSI for each of the satellite repeaters. Using this information for a previously heard unit, the RCS' table, or more specifically the RCS' controller relying on table data stored in memory, determines which repeater has the best path to the destination unit for the current message. The RCS then forwards the message only to this satellite repeater for retransmission. If there is a tie for the RSSI value, the repeater with the lowest hardware address, or similar conflict avoidance technique, is used for transmission.

As noted above, the system infrastructure will consist of repeaters ranging in number from 1 to N. The N synchronized repeaters provide branch 2N+1 diversity. Each repeater receives all transmitted packets to the best of its ability from any OCU or LCU in an area on one of two receivers, primary and secondary, using different antennas. In addition, the direct path provides another radio path, thus the diversity is 2N+1. The CRC is checked for each received packet and correct packets are tagged with their RSSI level. These packets are forwarded to the RCS over a high-speed LAN connection. The RCS collates the received packet RSSI, unit address, and satellite repeater address for each received message. The RCS uses the table to determine the satellite repeater to use when transmitting a packet to a specific OCU or LCU. In addition to sending the control data packets through the repeater, the OCUs and LCU within an RCL System also send packets to one another directly. In summary, spatial diversity is implemented and achieved by using two or more paths (the direct path, and one or more repeater paths) and frequency diversity is achieved in that a given receiver can hear a given message on the M frequency or the B frequency.

In direct mode (DCM) as depicted in FIG. 2, the LCU and OCUs talk without the need for infrastructure. The LCU and OCU radio transmitters send packets with a pseudorandom pattern in time and frequency. The pattern is uncorrelated with the Infrastructure TDMA slot pattern. The LCU will transmit on an M and a B frequency at different times every second to increase reliability through the use of time and frequency diversity. When operating in the direct communication mode:

1. The system shall be capable of operating in Direct Mode where no access point is required.
2. Direct mode shall have built in diversity.
3. The remotes shall transition from infrastructure to direct or direct to infrastructure in one second or less.
4. The Remote Mode shall allow at least one master and two remotes to communicate.
5. In Direct Mode, the remotes shall support sleep mode and wake on a control line.
7. The radio shall awake from sleep in less than 50 ms.

Note: Railroad (RCL) Sleep Implementation: The LCU remote will never sleep. The OCU remote radio will sleep under the control of the OCU processor unless it has a message to send. When the sleep control line awakens the OCU remote radio unit, it will send immediately. The OCU processor will keep the remote radio awake until it receives a message from the LCU. This method applies to the DCM and CCM operation.

When an LCU listens to the repeater transmit frequency, it can determine if infrastructure is present by receiving repeater beacon messages. Further, it can determine if it is allowed to associate with the yard infrastructure based on geographical boundaries as described in more detail below. If the RSSI of the repeater is heard and is strong enough (meaning above a pre-defined threshold level) and the LCU is within the yard area, the LCU uses a broadcast slot occupancy map, from the beacon, to select an open time slot. The LCU then transmits a packet addressed to its associated OCUs in an open time slot. Upon receiving the new LCU's message, the repeater can further limit use of the infrastructure based on the owner of the locomotive. Providing all of these criteria are met, the repeater begins retransmitting messages from the LCU and it's associated OCUs.

To update the RCS table, the receiving repeater forwards messages from LCUs and OCUs with their RSSI. With each message received, a table within the RCS is updated to contain the best path (based on RSSI) to a given unit. The LCU radio has the choice to send in DCM or CCM Mode. The LCU maps sets the MSB of the packet window count (Path Bit) to indicate the path used to the OCU. The OCU selects its return path based on the Path Bit. However, it is important to note that in a preferred embodiment, the LCU has complete control of the path used, to insure that coordination between each unit in the RCL system is maintained.

As mentioned above, locomotives need to determine rail yard boundaries to determine when the LCUs should switch from DCM mode to CCM mode. This prevents locomotives from using infrastructure out of useful range. It further prevents ambiguity as to which repeater community should be used if the LCU hears multiple repeaters that are not coordinated. The method described below allows locomotives to learn information about a yard, thereby dynamically reducing memory requirements and simplifying the logistics that would be required to update tables of yard information in the field.

Every repeater in the railroad yard (or multi-yard community of repeaters) takes turns transmitting a "yard information billboard" message. To supply useful information, this message is larger than will fit in one time slot, so it is split up into multiple time slots. Every repeater within the yard takes turns sending the same message. The billboard message contains at least the following information:

Hash Number (serves as an abbreviation for the whole billboard as well as a CRC);
Yard Center (Latitude and Longitude);
Yard Shape (oval, rectangle, triangle, etc.), 4 bits;
Yard X dimension, 4 bits (mu-law scale to give higher resolution for small yards and less resolution for large yards);
Yard Y dimension, 4 bits (same as above); and
Yard Rotation, 4 bits (degrees).

Locomotive radios associated with the LCUs will listen to this billboard message over two or more time slots and build up the information in a "database" of N yards. When a locomotive radio has completely heard the billboard message (and the hash number checks out with the data in the rest of the message), it will mathematically determine if it is within the defined area of the yard based upon a latitude/longitude signal it has received from an on-board global positioning system (GPS) or similar navigational device. If it is determined to be within the yard boundary, it will attempt to operate using the yard's infrastructure. If not, it will not attempt to operate using the infrastructure and will initiate or continue operation in DCM.

The first time a locomotive radio enters or is powered up in a given yard, it may take several seconds for it to fully hear the billboard message. Once the yard information is fully received, however, the next time the locomotive radio enters the yard, it will listen for the hash number and check it versus the list of N yards it already knows about. If the hash number matches, the locomotive radio will immediately attempt to get on the infrastructure. If after hearing the complete message, the hash number was not a duplicate of another previously visited yard, the locomotive radio will switch to the correct infrastructure.

When the number of yards a locomotive radio has visited exceeds N, the least recently used entry is dropped off the database list or table. It doesn't matter how old the entry is, just that it was the least recently used. This means that each time the LCU enters a previously entered yard, the entry (hash number) for that yard moves to the most recent entry in the list. It will be appreciated that alternative table sizes may be employed, and for LCUs or other equipment known to frequently move between numerous yard boundaries, the table size may be enlarged or alternative structures may be employed to facilitate storage of additional information.

In one embodiment of the present invention, the OCU in an RCL system is a sealed, self-contained belt pack unit that has no externally wired connections. To provide the ability to continuously improve the radio system, including upgrades of the OCU radio operating software, the present invention further contemplates a technique to upgrade the radio inside each OCU or provide a simulated radio link while remaining within the regulations of the FCC. For these modes, the OCUs radio uses an out of band frequency but with power output reduced to meet FCC regulations and prevent interference with other operational RCL systems. It is intended that the OCU be physically adjacent to the other end of the radio link (the "Kiosk") while in these modes, so using a greatly reduced power level satisfies the requirement. In this method, OCU maintenance mode uses all time slots in the TDMA scheme for a single communications link between the OCU and an upgrade station or "Kiosk". This allows the full 9600 bps to be used for the transmission of data between the Kiosk and the OCU radio. Conversely, a Test mode retains the TDMA slot assignment scheme to simulate normal operation. This can be used to exercise an OCU as it would be used in normal operation.

In one embodiment, the Kiosk consists of an identical radio unit. Both radios support a protocol where, when placed in maintenance or test mode, the frequency is set off from the normally used channels and the power is reduced to remain under the operating limit for licensed operation. This way maintenance and test modes do not interfere with the normal infrastructure and communications between LCUs and other OCUs. An OCU to be upgraded is placed immediately adjacent to the Kiosk to allow the weak signal to propagate between the Kiosk and the OCU. The Kiosk_Data packet is intended for manufacturer-specific use. As noted above, possible uses of kiosk data include device firmware update, diagnostic control, etc. from a maintenance "kiosk." The packet type-defined data for the kiosk data packet shall be in accordance with Table D:

TABLE D

| Byte | Bits | Content | Description |
|------|------|---------|-------------|
| 0-9  | 7-0  | Manufacturer-Specific | N/A |

Figure 14:
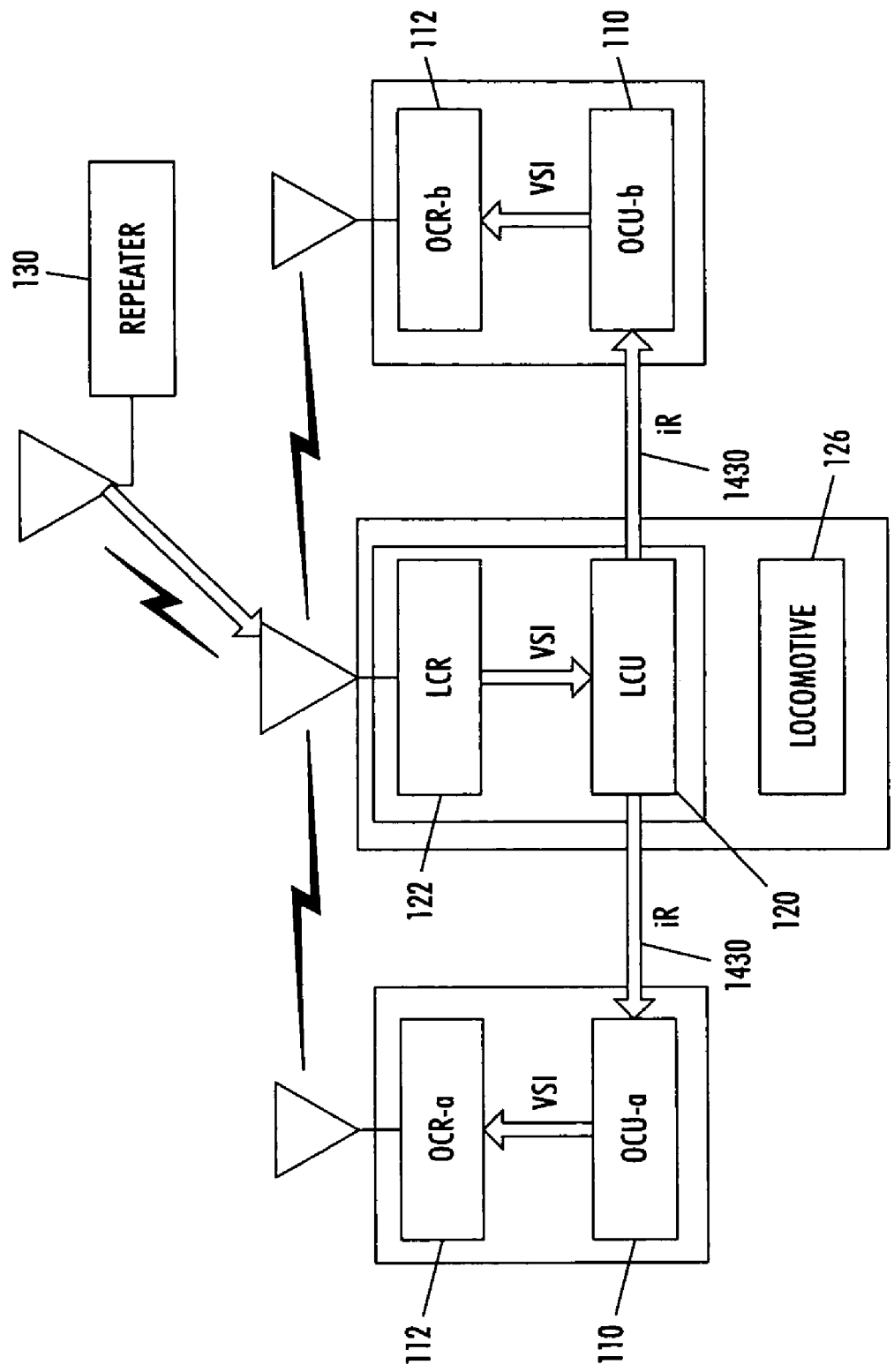
FIG. 14 is an illustrative block diagram depicting one method of pre-configuring components of the RCL system.

The present invention further contemplates Communications of Infrastructure Parameters via an Off-Channel Means. In the embodiment described above, each RCL system consists of an LCU 120 and two OCUs 110, for example the system depicted in FIGS. 5, 7, 14. Referring to FIG. 14, the LCU 120 and OCUs 110 communicate via a hard-wired Vendor-Specific Interface (VSI) connection to the LCU radio and OCU radios respectively. In turn, the respective OCU radios 112 and the LCU radio 122 communicate over the RF channel. In addition, the OCUs and LCU may also communicate over an infrared link 1430 when they are in close proximity (at setup or "Link" time). As described above, the LCU radio obtains infrastructure parameters from the repeater infrastructure via over-the-air beacons. Included in this information is a pair of additional radio channels (3 and 4) that can be used to support up to thirty additional locomotives. If all channels, 1 through 4 are in use, up to sixty locomotives are supported. While channels 1 and 2 are preferably fixed across the nation, channels 3 and 4 may vary in each yard. Accordingly, the specific frequencies that are used for channels 3 and 4 must be communicated to the OCU radios. Thus, the present invention further contemplates that the specific frequencies that are used for channels 3 and 4 (and any other necessary yard information) is communicated to the OCU 110 by the LCU 120 at Link time using the infrared channel 1430 as shown in FIG. 14. Alternately, the OCU radios could listen to the repeater beacons and obtain timing and yard information directly from the repeaters 130.

Figure 15:
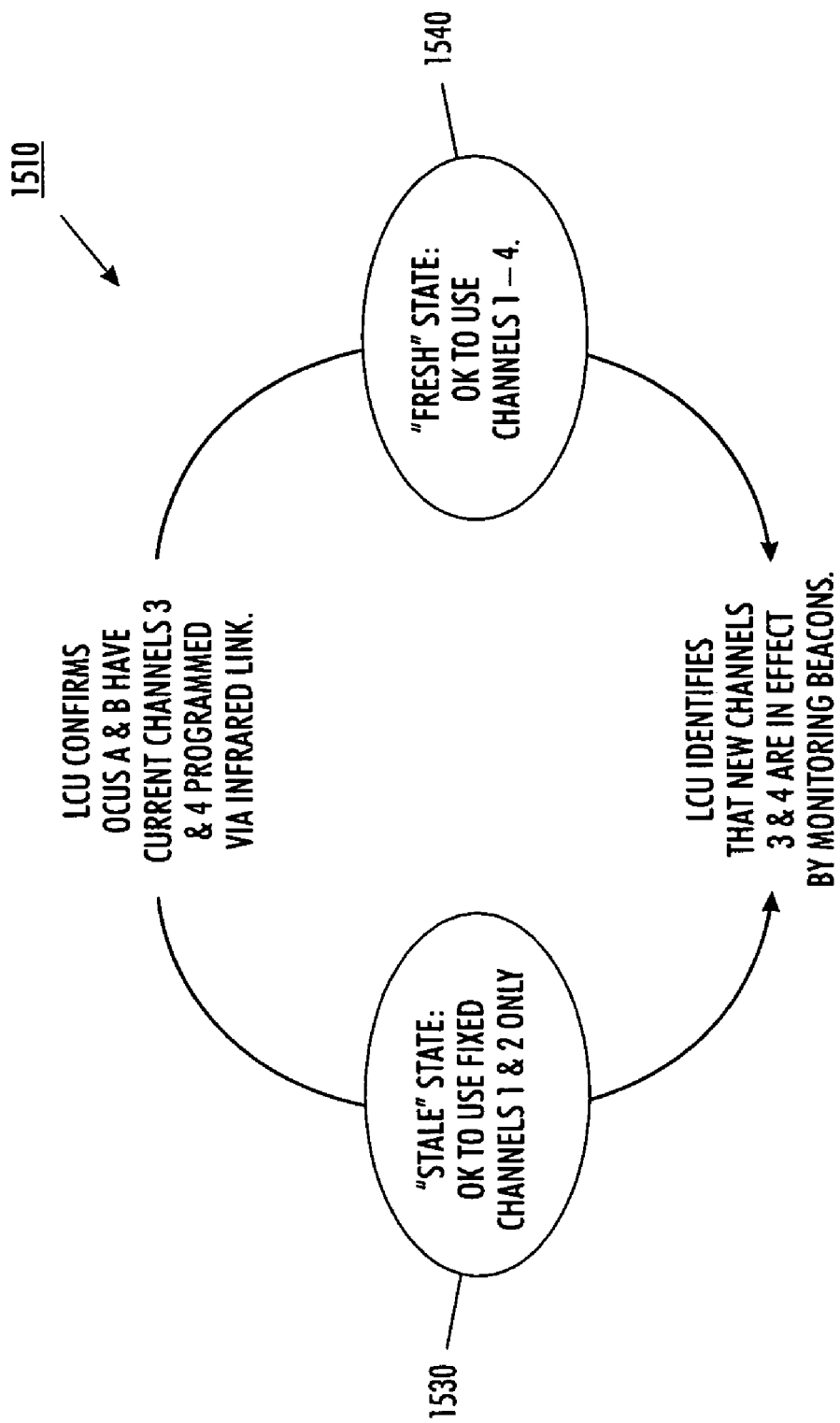
FIG. 15 is a state diagram illustrating an aspect of the invention.

Given that the OCU radios may have "stale" yard information, including which frequencies are used for channels 3 and 4, it would be possible to have communication outages in this case. To prevent this, the present invention further includes a state machine as depicted in FIG. 15. The state machine 1510 resides in the LCU in order to identify whether or not it is acceptable to use channels 3 and 4 at any given time, and thereby controlling the LCU between the "stale" state 1530 and the "fresh" state 1540 as illustrated.

Prior to beginning RCL operation, the LCU and OCU devices must exchange and coordinate certain preconfigured data to utilize the Common Air Interface (CAI) for communication. In addition to other information, the present invention specifically contemplates the exchange of a Radio Channel List (RCL), wherein certain functions of the system require devices to instruct each other to change channels, referenced by numeric identifiers. The actual channel frequencies associated with each identifier must be established between devices in an RCL system prior to operation of the CAI. Referring again to FIG. 14, one embodiment contemplates the use of infrared communications channels 1430 as a means for establishing channels in an RCL system. More specifically, the RCL system should provide the capability to coordinate the following information between LCU and OCU devices (radios) prior to commencement of CAI operation: (a) logical association and RCL System Identifier; (b) assignment of "a" or "b" status of each OCU radio; (c) a list of at least four radio channels and frequencies on which certain operations will occur (e.g. initialization, DCM operation, repeater channels, etc.); and (d) coordinated sequence of channels and timeslots on which DCM slot-hopping occur.

As described above, the repeater beacon is employed to broadcast data about the repeater infrastructure. The Repeater_Beacon_Data_Fragment_1 packet is one of two packets originated by the repeater infrastructure to broadcast information about the presence and status of the repeater infrastructure. It is periodically sent, along with its companion, the Repeater Beacon Data Fragment 2 packet.

The two repeater beacon data fragment packets provide information about the following: (a) the geographic limits of the yard or repeater coverage area within which RCL systems may operate in CCM; (b) a list of radio channels/frequencies on which RCL systems may operate in the area; and (c) status of time slot utilization within the area. The packet type-defined data for the Repeater_Beacon_Data_Fragment_1 packet shall be in accordance with the following format (Table E):

TABLE E

| Byte | Bits | Content | Description |
|---|---|---|---|
| 0 | 7-4 | Protocol Version | AAR-coordinated fixed value for version of the CAI protocol. Value = 1. |
| 0 | 3-1 | RESERVED | N/A |
| 0 | 0 | Fragment Index | Fixed Value = 0 |
| 1 | 7-0 | Yard Reference Point Latitude [MSB, 31-24] | Railroad-defined fixed 32-bit IEEE floating-point number representing the latitude, in decimal degrees, of the yard reference point. The yard latitude may be in the range of −90 to +90. The yard reference point (1610), yard shape index, and dimension indices are used to define the limits of the yard and/or repeater coverage area. RCL systems located within the defined limits may operate in CCM. |
| 2 | 7-0 | Yard Reference Point Latitude [23-16] | |
| 3 | 7-0 | Yard Reference Point Latitude [15-8] | |
| 4 | 7-0 | Yard Reference Point Latitude [LSB, 7-0] | |
| 5 | 7-0 | Yard Reference Point Longitude [MSB, 31-24] | Railroad-defined fixed 32-bit IEEE floating-point number representing the longitude, in decimal degrees, of the yard reference point. The yard latitude may be in the range of −180 to +180. |
| 6 | 7-0 | Yard Reference Point Longitude [bits 23-16] | |
| 7 | 7-0 | Yard Reference Point Longitude [15-8] | |
| 8 | 7-0 | Yard Reference Point Longitude [LSB, 7-0] | |
| 9 | 7-4 | Yard Rotation Index | Railroad-defined fixed value that defines the rotation of the yard shape. Integer R where shape rotation = (R/16) * 90 |
| 9 | 3-0 | Yard Shape Index | Railroad-defined value that indicates the geometric shape around the yard reference point that describes the coverage area limits. Index values are described in the table immediately below. |

Figure 16:
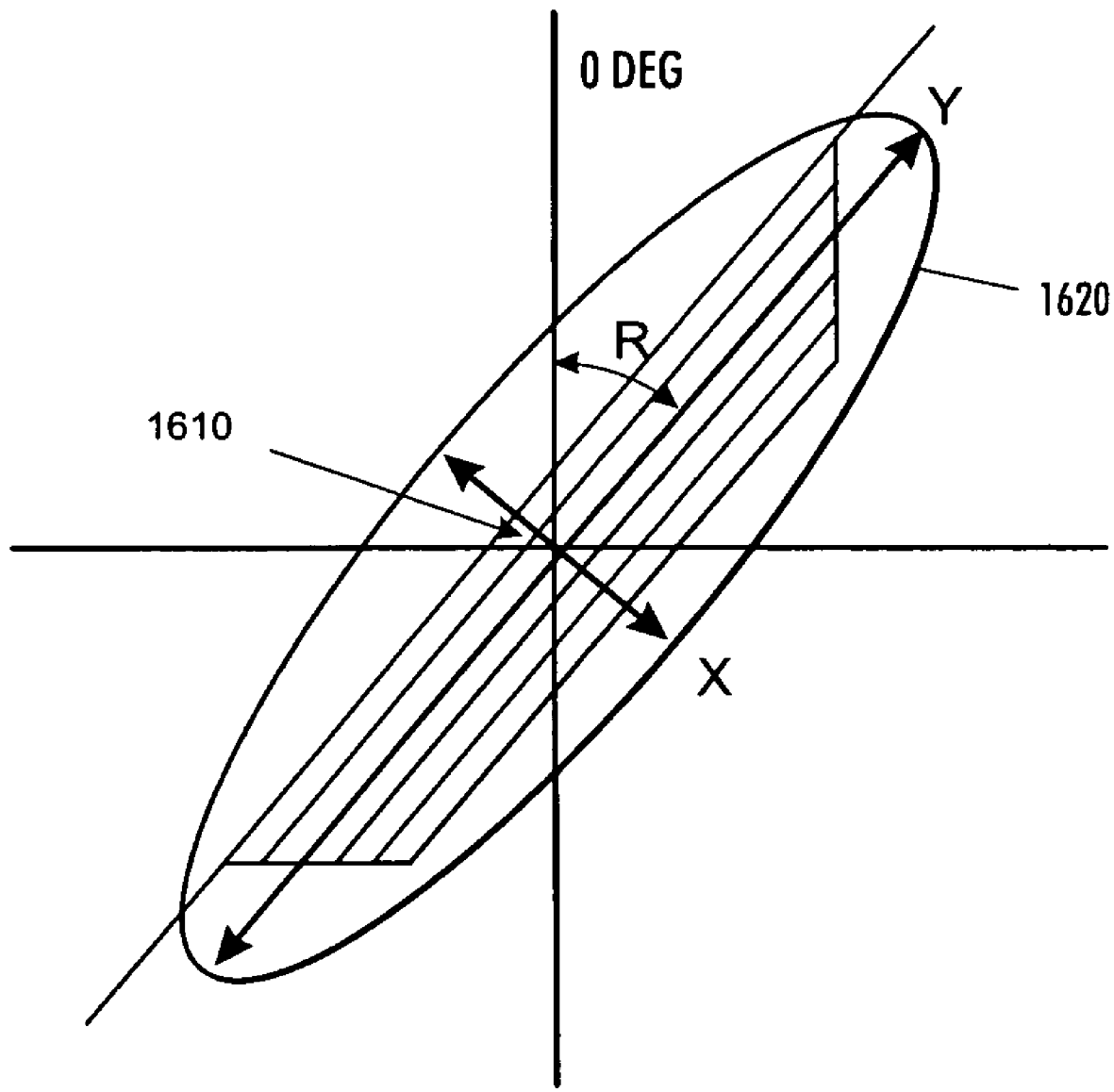
FIG. 16 depicts an exemplary elliptical characterization of the shape of a yard in accordance with one aspect of the invention.

In one embodiment, the shape of the yard is characterized by an index value, such as the index value for an ellipse 1620 as illustrated in FIG. 16, and as represented in Table F, although other shapes are contemplated:

TABLE F

| Index Value | Shape | Reference Point |
|---|---|---|
| 0 | Ellipse | Geometric center of ellipse |

The Repeater_Beacon_Data_Fragment_2 packet is the second of two packets originated by the repeater infrastructure to broadcast information about the presence and status of the repeater infrastructure. It is periodically sent, along with its companion, the Repeater_Beacon_Data_Fragment_1 packet. The packet type-defined data for the Repeater_Beacon_Data_Fragment_2 packet shall be in accordance with the following (Table G):

TABLE G

| Byte | Bits | Content | Description |
|---|---|---|---|
| 0 | 0 | Fragment Index | Fixed Value = 1 |
| 0 | 7-1 | RESERVED | |
| 1 | 3-0 | Yard Shape Y Dimension Index | Railroad-defined fixed Value used to calculate the Y dimension of yard shape described by the Yard Shape index. See see following Table for value formulae. |
| 1 | 7-4 | Yard Shape X Dimension Index | Railroad-defined fixed Value used to calculate the X dimension of yard shape described by the Yard Shape index. See see following Table for value formulae |
| 2 | 7-0 | Pre-configured Channel 4 B-Frequency Index [7-0] | An index for a fourth repeater channel in the yard. The channel index value, X, is defined as |
| 3 | 2-0 | Pre-configured Channel 4 B-Frequency Index [10-8] | BFREQ4 = 220.006250 + X * 0.00125 MHz<br>MFREQ4 = BFREQ4 + 1.0 MHz<br>A value of zero means no fourth repeater channel. |
| 3 | 3 | RESERVED | |
| 3 | 7-4 | Pre-configured Channel 3 B-Frequency Index [3-0] | An index for a fourth repeater channel in the yard. The channel index value, X, is defined as |
| 4 | 6-0 | Pre-configured Channel 3 B-Frequency Index [10-4] | BFREQ3 = 220.006250 + X * 0.00125 MHz<br>MFREQ3 = BFREQ3 + 1.0 MHz<br>A value of zero means no third repeater channel. |
| 4 | 7 | RESERVED | N/A |
| 5 | 7-0 | Timeslot Utilization Map [7-0] | Bit 23 is unused. Bits 22-8 correspond to slot groups 14-0, respectively, and indicate the availability of the slot group. Value = 1 for slot group available and 0 for slot group unavailable. Bits 7 and 6 are unused |
| 6 | 7-0 | Timeslot Utilization Map [15-8] | |
| 7 | 7-0 | Timeslot | |

TABLE G-continued

| Byte | Bits | Content | Description |
|---|---|---|---|
| | | Utilization Map [23-16] | Bits 5 and 4 indicate the current preconfigured channel on which the repeater is operating, 00 = 1, 01 = 2, 10 = 3, 11 = 4<br>Bit 3 is 1 if preconfigured channel 4 repeater is active, else 0<br>Bit 2 is 1 if preconfigured channel 3 repeater is active, else 0<br>Bit 1 is 1 if preconfigured channel 2 repeater is active, else 0<br>Bit 0 is 1 if preconfigured channel 1 repeater is active, else 0 |
| 8 | 7-0 | CRC-16 [7-0] | 16-bit CRC calculated over all fixed packet |
| 9 | 7-0 | CRC-16 [15-8] | type-defined data in the Repeater_Beacon_Data_Fragment_1 and Repeater_Beacon_Data_Fragment_2 packets. The Timeslot Utilization Map field is EXCLUDED from the CRC coverage. Generator polynomial is $G(x) = x^{16} + x^{12} + x^5 + 1$. |

Referring to FIG. 16, the shape of the yard, in one embodiment, may be characterized as an ellipse, index value 0, and the characteristics of the ellipse are set forth in accordance with the following formulas, wherein the X and Y coordinates are represented in the figure.

TABLE H

| Yard Shape | Index Value | X Dimension Formula | Y Dimension Formula |
|---|---|---|---|
| Ellipse | 0 | $1609.344 * (1 + (X/6)^{2.9555})$ meters | $1609.344 * (1 + (Y/6)^{2.9555})$ meters |

Repeater beacon data is broadcast by the repeater infrastructure to convey information about the infrastructure, its operating channels, and its coverage limits. The repeater infrastructure will maintain and populate certain data in the repeater beacons, particularly the data necessary to dynamically populate the fields of the Repeater Beacon Data Fragment 1 and Repeater_Beacon_Data_Fragment_2 packets. The repeater infrastructure shall maintain the status of each timeslot group as expressed in Timeslot Utilization Map field of the Repeater Beacon Data Fragment 2 packet as follows:
Unavailable:
(a) a Repeater_Timeslot_Grant packet for the slot group has been sent within a period TRSLOTHOLD, a railroad- or manufacturer-defined value for the maximum time the RCL repeater will maintain an RCL system's slot reservation in the absence of packet transmission activity; or
(b) a valid packet has been received in the timeslot group and retransmitted within the period TRSLOTHOLD.
Available:
(a) no Repeater_Timeslot_Grant packet has been sent for the slot group within the period TRSLOTHOLD; and
(b) no valid packet has been received in the timeslot group and retransmitted within the period TRSLOTHOLD In one embodiment, the time period, TRSLOTHOLD, should not be less than five seconds. It is the responsibility of the LCU or OCU radios to generate CCM traffic at intervals sufficient to satisfy the repeater timeout (TRSLOTHOLD) and maintain authorization to use the slot group on the repeater infrastructure. The Repeater Infrastructure will update the Timeslot Utilization Map field at a rate not less than about once every two seconds. And, the Repeater infrastructure should rotate transmission of the Repeater Beacon Data Fragment 1 and Repeater Beacon Data Fragment 2 packets such that each is transmitted in both the RCLTX1 and RCLTX2 timeslots of each repeater in a yard infrastructure at least once every ten seconds. The rotation of beacon data fragment transmission order and transmitting repeater are to minimize interference. The sequence of packet alternation and repeater selection is preferably manufacturer-defined.

In recapitulation, the present invention is a method and apparatus for coordinating Remote Control Locomotive radio devices, and in particular to a system and method for assuring reliable communications between an operator (OCU) and a locomotive (LCU) being remotely controlled. The present invention further includes a methodology for testing and assuring such communications.

It is, therefore, apparent that there has been provided, in accordance with the present invention, a method and apparatus for coordinating Remote Control Locomotive radio devices. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for remote control of locomotives, comprising the steps of:
   providing a single time division multiple access network for communication between at least one locomotive control unit and at least two operator control units, said locomotive control unit being interfaced so as to enable the remote control of a locomotive, wherein said network employs both spatial and frequency diversity for remote control, wherein the network comprises a centralized coordination mode comprising a repeater infrastructure along with a distributed coordination mode wherein the locomotive control unit communicates directly with the operator control units, wherein the repeater infrastructure communicates coverage area and defines periods of time for communication by the at least one locomotive control unit and the at least two operator control units;
   configuring the at least one locomotive control unit and the at least two operator control units to use the centralized coordination mode simultaneously with the distributed coordination mode; and
   exchanging information between the locomotive control unit and at least one operator control unit, via the network, so as to operatively control the locomotive, wherein each of the locomotive control unit and the operator control units will only transmit in a respective defined period of time.

2. The method of claim 1, wherein the repeater infrastructure comprises a Plurality of repeaters and a repeater coordination server and, further comprising the step of:
   coordinating the communications of the plurality of repeaters using the repeater coordination server to optimize a communication path between any locomotive control unit and any operator control unit.

3. The method of claim 2, further comprising the steps of:

calculating a received signal strength indication for each signal from a locomotive control unit and an operator control unit received by each repeater;

sending the signal and the received signal strength indication to the repeater coordination server; and optimizing the communication path by selecting the repeater with the largest received signal strength indication for each of the locomotive control unit and the operator control unit to transmit messages bound for the respective unit.

4. The method of claim 1, further comprising the step of determining if a remotely controllable locomotive is within a region covered by the infrastructure of a rail yard.

5. The method of claim 4, wherein the step of determining if a remotely controllable locomotive is within a region covered by the infrastructure of a rail yard, comprises the steps of:

determining the locomotive's current geographical position based upon a latitude/longitude signal derived from a navigational device;

transmitting, from each repeater in the railroad yard a yard information message;

receiving, with a receiver associated with a locomotive control unit, the yard information message; and comparing the yard information message to the current geographical position to determine if the locomotive is within the defined area of the yard.

6. The method of claim 1, wherein the time division multiple access network further comprises a plurality of communications channels and wherein the locomotive control unit and the operator control units communicate with transmitter/receivers that are configured to hop amongst a plurality of channels and a plurality of timeslot groups therein.

7. The method of claim 6, wherein a transmit/receive frequency changes for each time division multiple access frame.

8. The method of claim 7, wherein the repeater transmit frequency is different than the repeater receive frequency.

9. The method of claim 1, further comprising the step of using repeater beacon packet to broadcast information about the presence and status of the repeater network infrastructure.

* * * * *

UNITED STATES PATENT AND TRADEMARK OFFICE
CERTIFICATE OF CORRECTION

PATENT NO. : 7,653,465 B1  Page 1 of 1
APPLICATION NO. : 11/324713
DATED : January 26, 2010
INVENTOR(S) : Geiger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this

Twenty-third Day of November, 2010

David J. Kappos
*Director of the United States Patent and Trademark Office*